US007260841B2

(12) United States Patent
Tenereillo (10) Patent No.: US 7,260,841 B2
(45) Date of Patent: *Aug. 21, 2007

(54) SYSTEM AND METHOD FOR MAINTAINING ACCESS TO CONTENT IN AN ENCRYPTED NETWORK ENVIRONMENT

(75) Inventor: Peter Tenereillo, Carlsbad, CA (US)

(73) Assignee: Nortel Networks Limited (CA)

( * ) Notice: Subject to any disclaimer, the term of this patent is extended or adjusted under 35 U.S.C. 154(b) by 676 days.

This patent is subject to a terminal disclaimer.

(21) Appl. No.: 10/375,549

(22) Filed: Feb. 27, 2003

(65) Prior Publication Data

US 2004/0172528 A1 Sep. 2, 2004

(51) Int. Cl.
*H04K 1/10* (2006.01)
*G06F 15/16* (2006.01)
*G06F 9/00* (2006.01)

(52) U.S. Cl. .......................................... 726/15; 380/33
(58) Field of Classification Search ................. 726/15; 455/410; 380/270, 33
See application file for complete search history.

(56) References Cited

U.S. PATENT DOCUMENTS

2001/0039659 A1* 11/2001 Simmons et al. ............. 725/61
2002/0026503 A1* 2/2002 Bendinelli et al. .......... 709/220
2002/0138635 A1* 9/2002 Redlich et al. ............. 709/229
2003/0229697 A1* 12/2003 Borella ....................... 709/226

OTHER PUBLICATIONS

Colajanni (Michele Colajanni , Philip Yu and Daniel Dias, "Analysis of Task Assignment Policies in Scalable Distributed Web-Server Systems", "IEEE Transactions on parallel and distributed systems", vol. 9, No. 6, Jun. 1998).*

* cited by examiner

*Primary Examiner*—David Y. Jung
*Assistant Examiner*—Peter Poltorak
(74) *Attorney, Agent, or Firm*—McGuinness & Manaras LLP (57) ABSTRACT

A system of redirecting encrypted requests for content at a web site includes the steps of receiving, at a first web site, data enabling secure communication with a client, receiving, at the first web site, a request for content from the client, identifying an alternate web site to service the request from the client and forwarding a communication associated with the request to the alternate web site including forwarding the data enabling secure communication to the alternative web site. Such an arrangement allows a web site to communicate with a client using encrypted packets without having previously set up a tunneled connection, thereby aiding in disaster recovery and providing a facilitating client proximity detection when traffic is encrypted.

10 Claims, 10 Drawing Sheets

SYSTEM AND METHOD FOR MAINTAINING ACCESS TO CONTENT IN AN ENCRYPTED NETWORK ENVIRONMENT

FIELD OF THE INVENTION

This invention relates generally to the field of networking, and more specifically to a system for optimally servicing client requests in a network wherein some of the traffic is encrypted.

BACKGROUND OF THE INVENTION

As is known in the art, load-balancing solutions are becoming more common to support high-traffic Web sites. Typically high traffic Web sites can't process all requests on a single server. In order to increase the performance of the Web site (where the performance can be measured in response time to requests, among other criteria), one may seek to increase the capabilities of the server supporting the Web site. Rather than move the Web site to a more powerful and expensive hardware, clusters, or farms, of servers are provided, where each of the clusters store mirrored copies of the Web site. As requests are received for access to the Web site, the 'best' server cluster is selected to respond to each request. The selection of the 'best' server cluster for each web request depends upon a variety of considerations, including the health, user proximity, weights, and response times associated with each of the servers.

Some technologies that attempt to provide a measure of geographic distribution of Web requests rely primarily on Domain Name System (DNS) techniques, which rely on the DNS server alone or in combination with other logic. For example, round robin DNS techniques map multiple IP addresses to a single DNS host name. As clients resolve the hostname, DNS responds by cycling through the multiple IP addresses mapped to the host name. The DNS technique may be further enhanced by using routing metrics or network distance calculation. Alternatively, sets of IP addresses may be associated with geographically diverse DNS servers. While the DNS techniques provide some load sharing capabilities, they are problematic because they are resource intensive to resolve and are typically incapable of being content aware.

An improved load balancing approach for high traffic web sites is implemented in the Alteon line of products provided by Nortel Networks, Ltd. The Alteon product line includes Content Directors (CDs), which are designed to route or load balance requests between web sites. Various data is used in determining the client proximity to the available servers and thus where to route requests. This data includes the distance between server and client, the current health of each site, the response time for each site (indicating the relative load at the site), and the availability of content at each site. The CDs are able make client proximity calculations at TCP connection time using a selection of proximity detection methods. Because the CD can make client proximity calculations at TCP connection time, the CD is able to calculate the closest topographical path between the client and each site, rather than having the calculation performed by the client's local DNS server.

Figure 1:
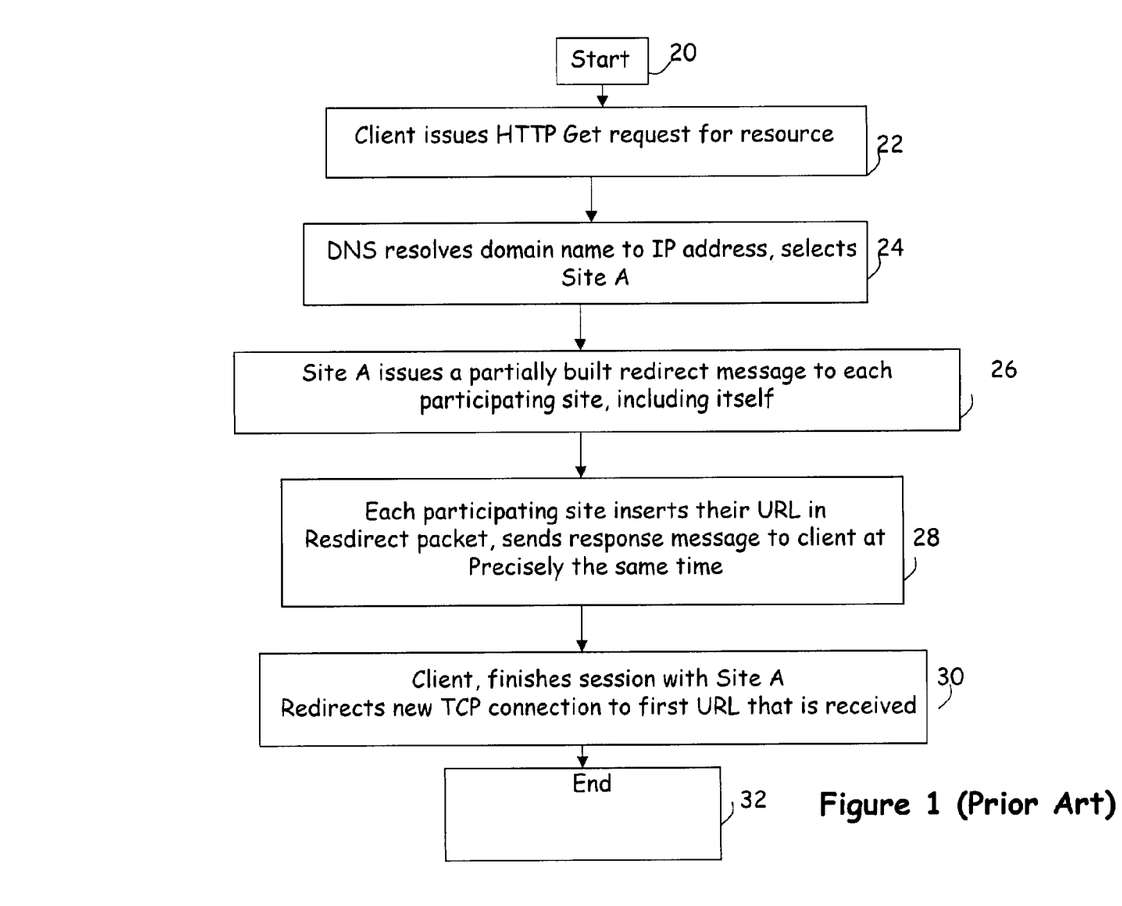
FIG. 1 illustrates exemplary steps that are used in a prior art footrace method for selecting an optimal web site to service a client request.

Several of the techniques used by a CD for proximity detection are described in U.S. patent application Ser. No. 09/728,305, entitled "A Method and Apparatus for Discovering Client Proximity", filed Nov. 30, 2000 by Tenereillo et al. (hereinafter referred to as the Tenereillo patent), incorporated by reference herein. An exemplary method disclosed in the Tenereillo patent is a so-called 'footrace' method for determining client proximity. The basic blocks of the footrace method are shown in FIG. 1, and will be described with regard to a client requesting content that is mirrored at three different web sites; Site A, Site B and Site C. Initially, at step 22 the client establishes a set of TCP connections to a Web Site by requesting access to a resource having a certain IP address. At step 24, DNS resolves the domain name to the IP address of one of the sites in the global domain, for example Site A. The global domain is registered in DNS with a unique Fully Qualified Domain Name (FQDN).

At step 26, the CD at Site A that receives the client's initial request acts as a synchronizing CD, and forwards partially built redirect messages to each participating web site (i.e., web sites which store mirrored copies of the content) including itself. The redirect message includes a local domain field and a response time field. The local domain field indicates the local domain to which future requests for the resource should be redirected. When the synchronizing CD partially builds the redirect messages, it leaves the local domain URL portion of this field empty. The response time field stores a time value indicating when the CDs at the participating web sites should forward their rebuilt redirect message back to the client.

At step 28, the CD at each web site that receives the partially built redirect message fills in the local domain field with their own local domain URL to provide a rebuilt redirect message. At the precise time indicated by the response time field, the CD at each participating web site forwards the rebuilt redirect message (with modified local domain URL) back to the client. In essence, a footrace ensues, with the participating web site having the fastest response time winning the footrace back to the client. At step 30, the client breaks the TCP connection with the synchronizing web site (Site A, in the above example, assuming Site A did not win the footrace), and initiates a new TCP connection to the local domain URL retrieved in the 'winning' redirect message.

Alternative methods of selecting the most proximate client are also described in the Tenereillo patent, and may include caching the URL of the 'best' Web site for client requests and building an HTML page having links between the various Web Site local domain names and the client to permit the client to calculate the round trip time for accessing each local domain.

However, one problem with the above described method of determining the optimum Web site is that is cannot be used in an environment where encrypted traffic is transferred between a client and a server, since certification and authentication is generally done on a point to point (client/server) basis. Accordingly, it would be desirable to determine a method for load balancing web site resources in a network including encrypted traffic.

SUMMARY OF THE INVENTION

According to one aspect of the invention, a method of redirecting encrypted requests for content at a web site includes the steps of receiving, at a first web site, data enabling secure communication with a client, receiving, at the first web site, a request for content from the client, identifying an alternate web site to service the request for content and forwarding the request for content to the alternate web site including forwarding the data enabling secure communication to the alternate web site.

According to another aspect of the invention, a method for disaster recover in a network wherein content is mirrored and traffic is encrypted includes the steps of establishing, at a first data center, a secure communication path with a client, determining that content at the first data center is unavailable, and, responsive to a request from the client for the content, forwarding the request to a second data center that mirrors the content, including forwarding data enabling secure communication with the client.

According to a third aspect of the invention, a data center is provided for storing a plurality of resources, where the data center includes a table for storing, for at least one resource, an address of an alternate data center storing a copy of the resource, an interface for establishing a secure communication path with a client device, a storage mechanism for storing data enabling secure communication with the client device, and means for forwarding the data enabling secure communication with the client device to the alternate data center.

With such an arrangement, seamless redirect of requests may be performed in the event that a resource becomes unavailable at a web site.

DETAILED DESCRIPTION

Figure 2:
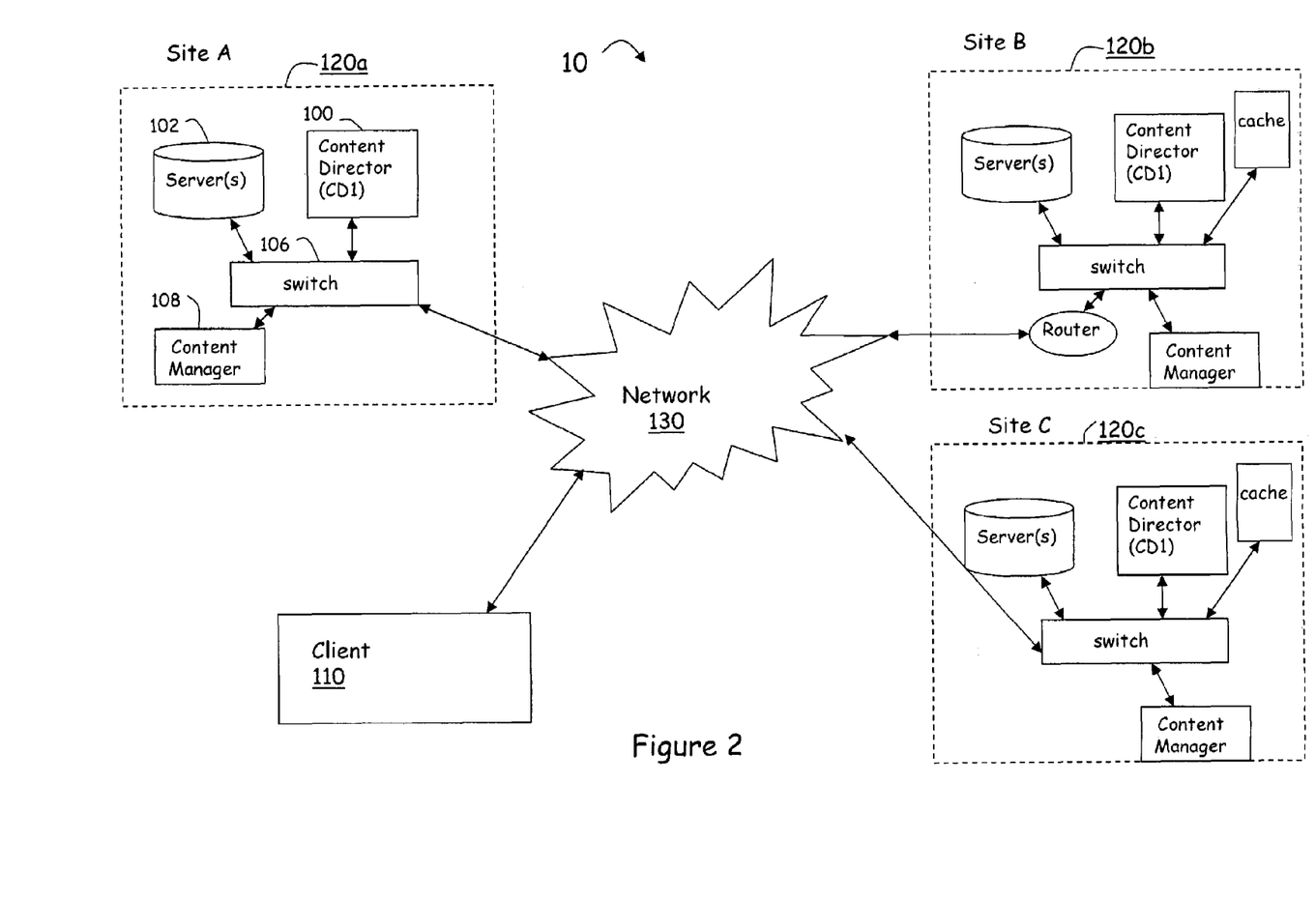
FIG. 2 is a block diagram of a system according to the present invention for web site load balancing of encrypted traffic.

According to one aspect of the invention, a method for load balancing web site resources in an environment where traffic is encrypted will now be described. Referring now to FIG. 2, a block diagram illustrating exemplary components that may be included in such a system is shown.

In FIG. 2, a system 10 is shown to include a plurality of web site data centers 120a-120c coupled to a client 110 via network 130. Each web site 120a-120c represents a data center for storing resources that are available to the client. For the purposes of this application, at least a portion of the resources are mirrored at each of the web sites.

Each data center is shown to include a number of components that are used to manage and deliver streaming media content to a coupled client in an efficient manner. Exemplary components that may be included in the data center include a content director (CD) 100 and one or more content servers 102. One function of the content director is to perform load balancing of resource requests across the various data centers that are coupled to the network. It should be noted that the server performance could be further accelerated through the inclusion of a cache device, coupled to the switch, although the present invention is not limited to any particular memory service configuration.

The CD 100 and content servers 102 are shown coupled to a switch 106, which controls access to the network 130. Although a switch is shown, it should be understood that any set of devices typically used to connect to a network could alternatively be used, and the present invention is not limited to the use of any particular network connection device. In one embodiment, a content manager 108 is coupled to the switch to provide system management, content management and accounting management features.

Each Content Director constantly communicates with the other CDs in the network over a TCP/IP connection. In one embodiment, the CDs use a specific protocol referred to as an Interbox Protocol (IBP), although other types of TCP/IP messaging may be used and the present invention is not limited to the use of any specific protocol for communication between CDs. The various data that is exchanged between the CDs includes redirect message (for directing requests for a resource received at one CD to another CD that stores a copy of the resource) and time-stamp information (to allow each CD to monitor the clock of the other data centers for synchronization of operations). As the number of data centers increases, the volume of IBP traffic may impede system efficiency. Thus, according to one embodiment of the invention, the data centers are grouped into global domains and local domains. A global domain includes one or more local domain data centers. When a request is received for a resource, DNS resolves the request to any one of the local domains within the global domain. However, it may be that the local domain selected is not the optimal data center to service the request (whether due to proximity, load, or other factors). The Content Directors, upon receiving the client request, redirect the request to the 'best' local domain within the global domain using any number of methods, such as the footrace method described with regard to FIG. 1.

However, a problem arises in using the footrace method of FIG. 1 when traffic is encrypted. Encryption of networked data has increased because in today's computing environment, the connection between a client and any other point may be routed through dozens of connections. Through spoofing, snooping and general eavesdropping, unauthorized users find it relatively easy to obtain personal client information, such as credit card numbers, social security numbers, etc. As such, security measures have been developed to maintain client privacy. One of the security protocols that is typically used is the Secure Socket Layer (SSL) protocol.

The SSL protocol operates as follows. When a client and server communicate, SSL ensures that the connection is private and secure through encryption and authentication. Authentication confirms that the server and the client are who they say they are, and have the proper authority to access the information. Encryption creates a secure tunnel between the client and server by encrypting the data and through the use of keys that each end uses to encrypt and decrypt the data. As a result, any unauthorized user who obtains the data but does not have the key will be unable to read what is viewed.

An SSL protocol is actually comprised of two protocols; the SSL Handshake protocol and the SSL Record protocol. A transaction consists of two distinct parts: the key exchange and the bulk data transfer. The SSL Handshake Protocol handles the key exchange and the SSL Record Protocol handles the bulk data transfer.

Figure 3:
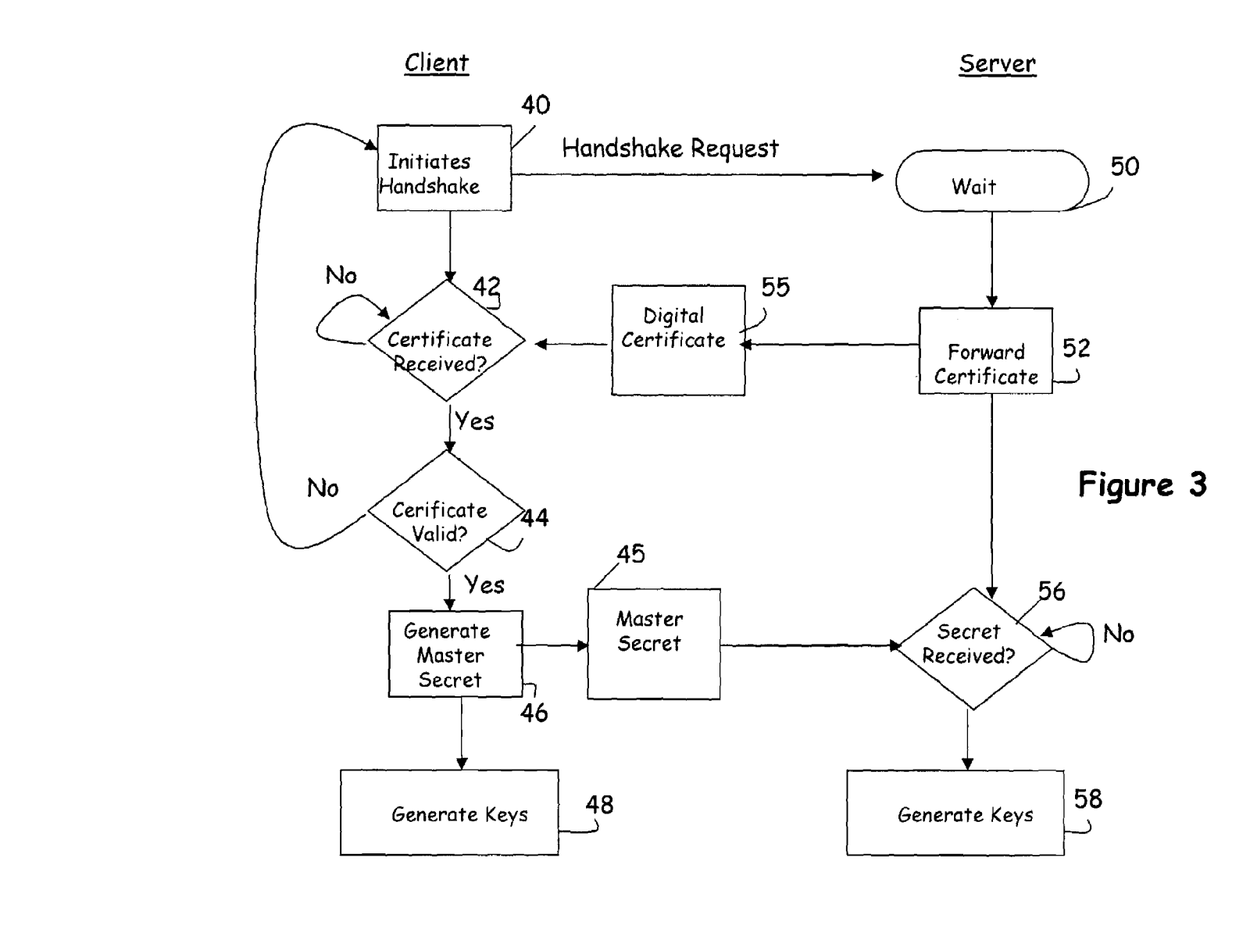
FIG. 3 is a flow diagram illustrating exemplary steps performed during establishment of a secure communication between a client and a web site using Secure Socket Layer (SSL) technology.

In FIG. 3 a functional flow diagram is provided to illustrate the interplay between the client and server during SSL handshake. At step 40 the client initiates the handshake by requesting an SSL session with the server. The server, receiving the request transitions from a wait state 50, and at step 52 forwards its digital certificate 55 to the client. The digital certificate contains information about the web server, including the server's public key. When the certificate is received, the client checks its validity at step 44 to verify that the certificate is valid (i.e., verifies that it is current and issued by a trusted third party Certificate of Authorities). If the certificate is not valid, the process returns to step 40 to obtain another certificate. If it is valid, then at step 46 the client generates a 48 byte master secret. The secret is encrypted using the server's public key. The encrypted master secret 45 is then forwarded to the server. Upon receiving the master secret from the client, the server then decrypts the master secret using the server's private key. Both the client and the server both have the same master secret at this point, and they use this master secret to create keys for the encryption and MAC algorithms.

Once both the client and server have the same encryption and MAC keys, they use known SSL encryption and authentication mechanisms to create and encrypted tunnel. Through the encrypted tunnel, they can now pass data securely through the internet.

As mentioned in the background, a problem arises when attempting to determine the optimal web site for servicing client requests when the traffic is encrypted using protocols such as the SSL protocol. This is because, as described above, the tunnel is generated between a specific server and client pair. Generally speaking, in order for any other web site to communicate with the client, a similar tunnel should be built between the two. Such a solution is time consuming, and, due to the numerous steps involved in setting up the tunnel, would make it difficult to discern optimal web site for servicing client requests in a timely manner.

However, according to one aspect of the present invention, a system is provided for allowing a mirrored web site to forward encrypted packets to a client without having previously established a tunnel between the web site and the client. This system can be used for two alternative purposes. First, it can be used to seamlessly redirect encrypted requests from a failing web site to an alternative web site in a manner that is transparent to the client. As a result, client requests can be serviced without delay, error messages, or the need to re-establish a new secure session. In addition, the system can also be used to select an optimal web site for servicing client requests using the footrace method discussed above in FIG. 1 using encrypted traffic.

Figure 4:
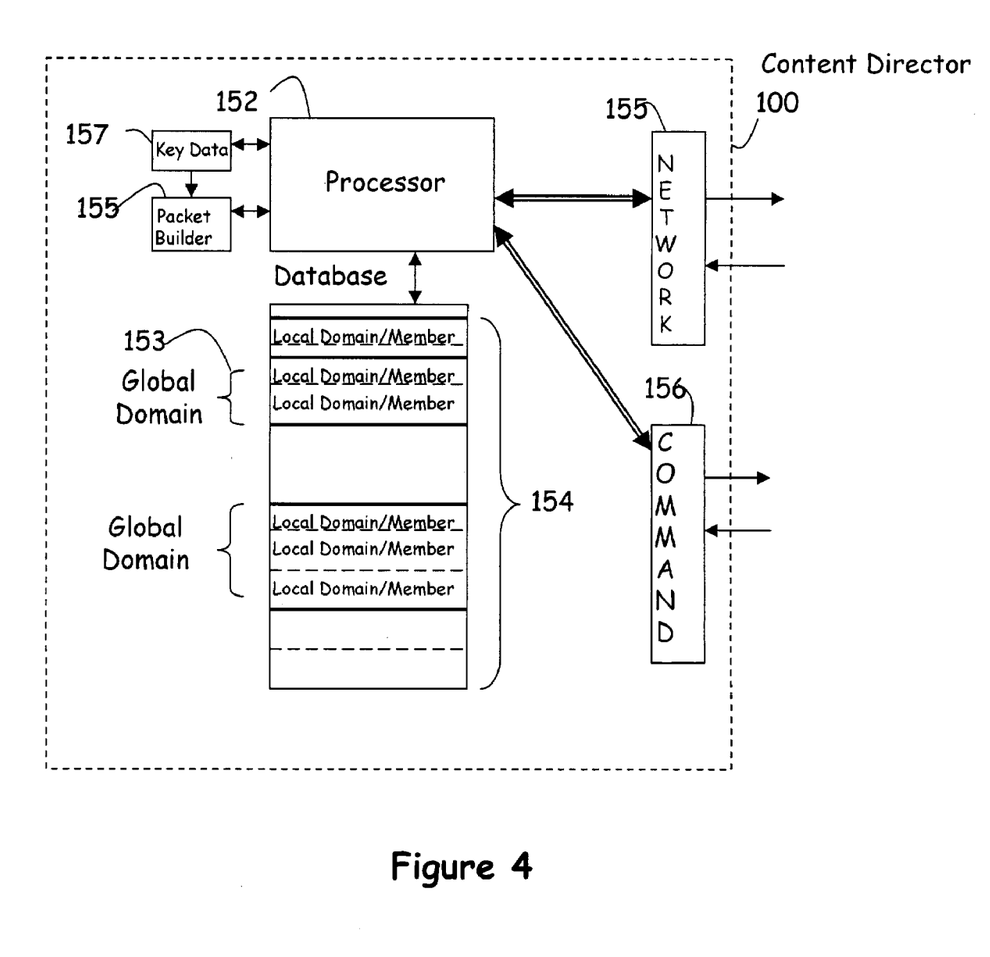
FIG. 4 is a block diagram illustrating exemplary components that may advantageously be included in a Content Director (CD) of the present invention.

Referring now to FIG. 4, certain components that may be included in the Content Director 100 to implement load balancing of encrypted traffic are shown. The CD 100 is shown to include a processor 152, coupled to a database 154 which stores global domain information 153. The processor communicates via a network interface 155 to switch 106, or via a command line interface 156 to the content manager 108 or a network administrator via graphical user interface (GUI). The command line interface (CLI) allows the administrator to define the global domains of which the data center is a member. In addition, it also allows the local domains in the global domain to be identified. As shown in FIG. 4, exemplary global domain information 153 includes several local domains. In FIG. 4, a database is shown coupled to the processor, in which this data is shown, although the data may be stored in any location that is accessible to the CD. Also shown in FIG. 4 is a packet builder 155

The packet builder is shown as a distinct entity to represent its functionality, although it should be understood that the packet builder is advantageously implemented in a combination of hardware and software to build an encapsulated packet as will be described below. Also included in the CD is key data storage 157.

The key data storage 157 provides the packet builder 155 with key data for encrypting packets, thereby enabling a CD to internally build encrypted packets for each of the other CDs in its global domain. According to one aspect of the invention, a packet may be pre-built at a first CD, encrypted using the key data that the first CD received when establishing a tunnel with the client, and encapsulated in a communication to a second CD in the same global domain. The second CD recognizes that it is a pre-built packet for the client, strips off header information from the first CD identifying it as such, and forwards the encrypted packet to the client.

Providing a mechanism for a CD to communicate encrypted data to a client without having previously established a tunnel between the particular site and the client provides at least two advantages over the prior art. In the prior art, in the event that a resource becomes unavailable at a first data center, a client has to break down the tunnel with the first data center and build a tunnel with the mirror data center, thereby incurring a delay in obtaining access to the resource. With the invention, the first data center can easily redirect all requests from a client to the mirrored site. Security concerns can be addressed in the background without interrupting the user's access to the resource. Thus the present invention provides a mechanism for disaster recovery.

Figure 5:
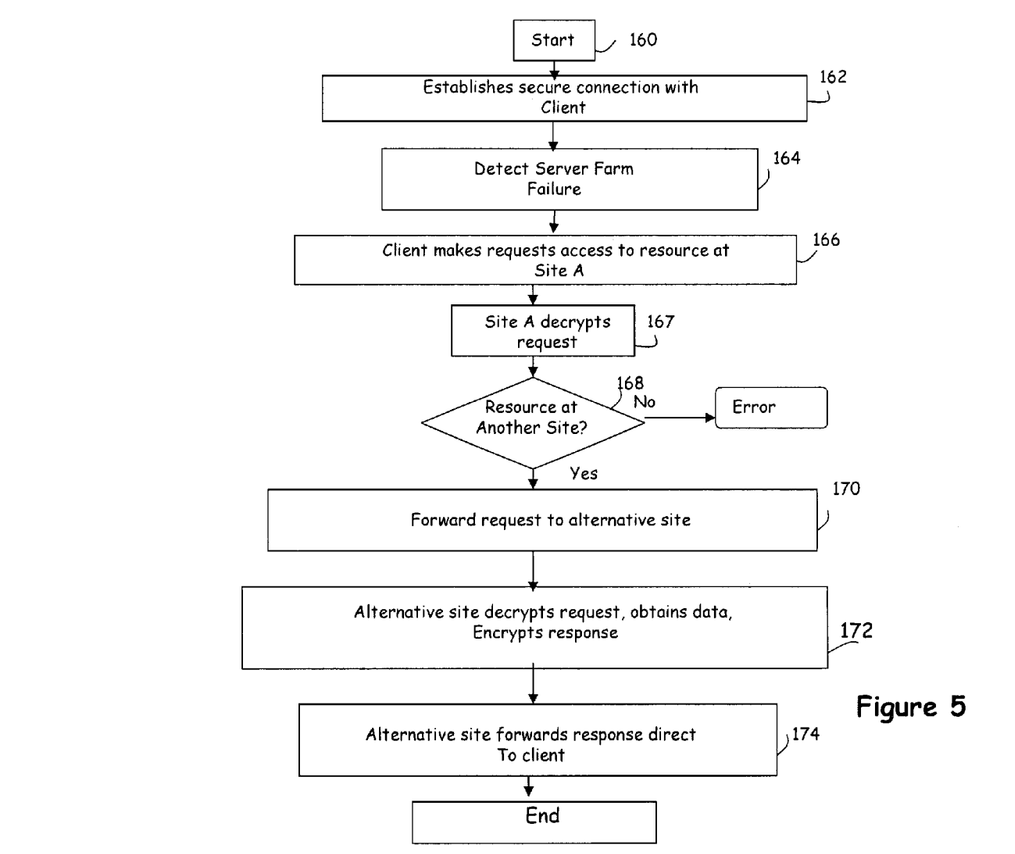
FIG. 5 is a flow diagram illustrating a method that may be used to redirect encrypted packets for disaster recovery purposes.
Figure 6:
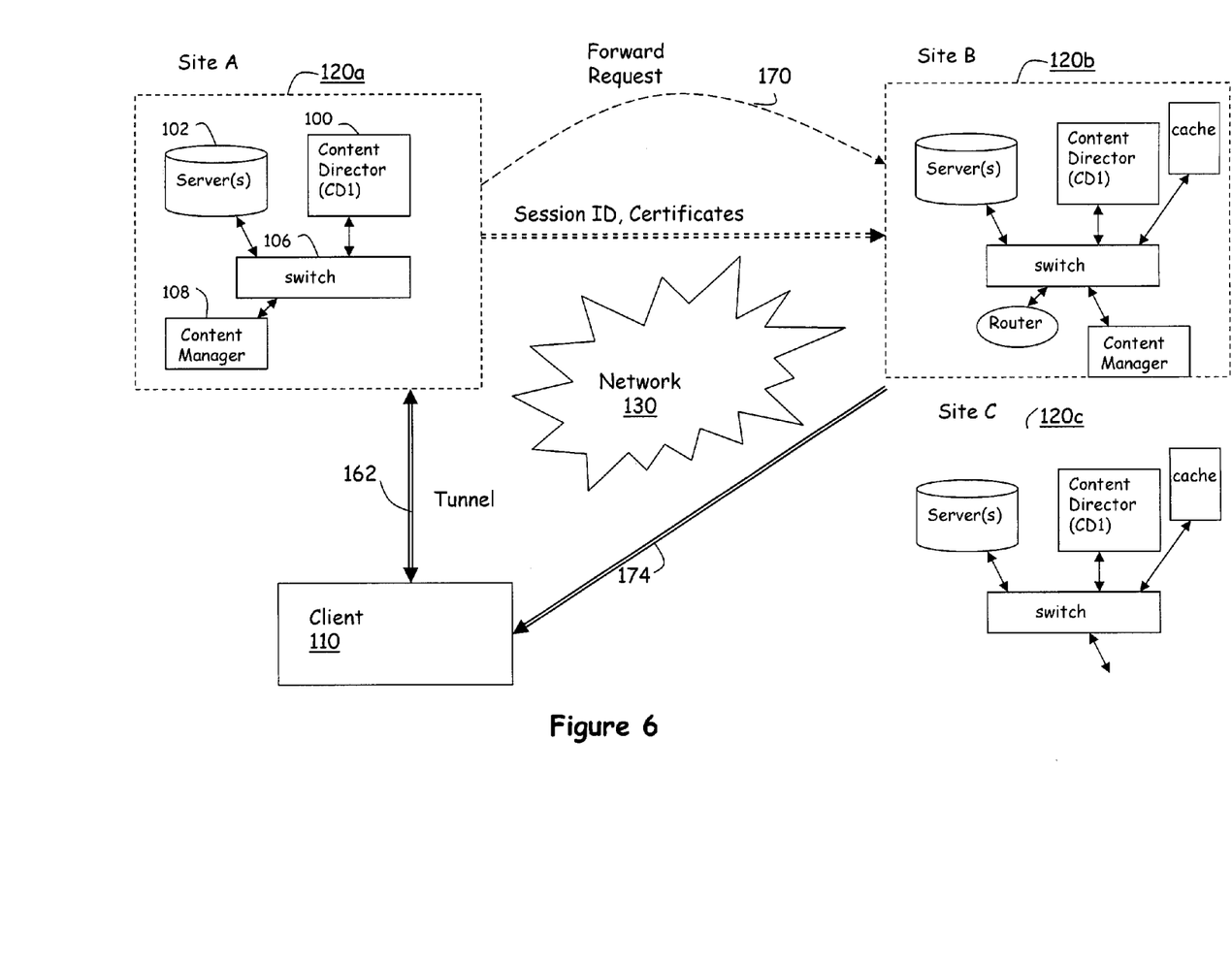
FIG. 6 is an illustrative block diagram showing the flow of packets in the process described in FIG. 5.
Figure 7:
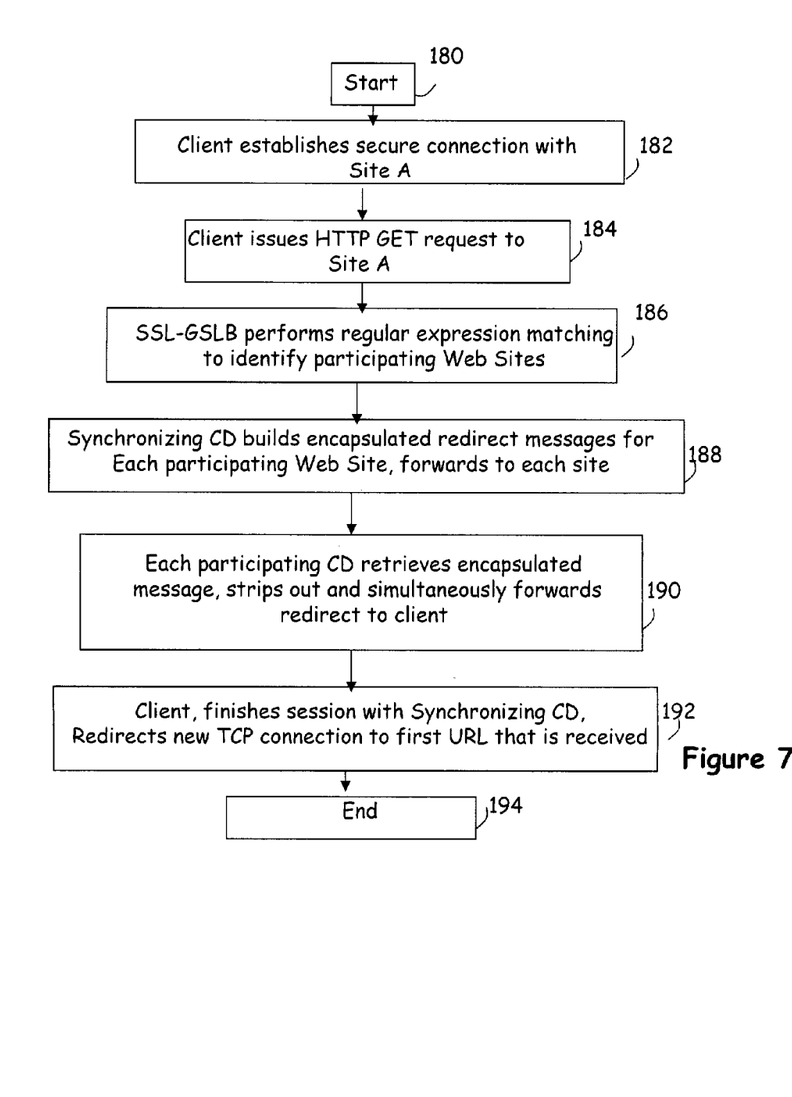
FIG. 7 is a flow diagram illustrating a method of load balancing encrypted traffic.
Figure 8A:
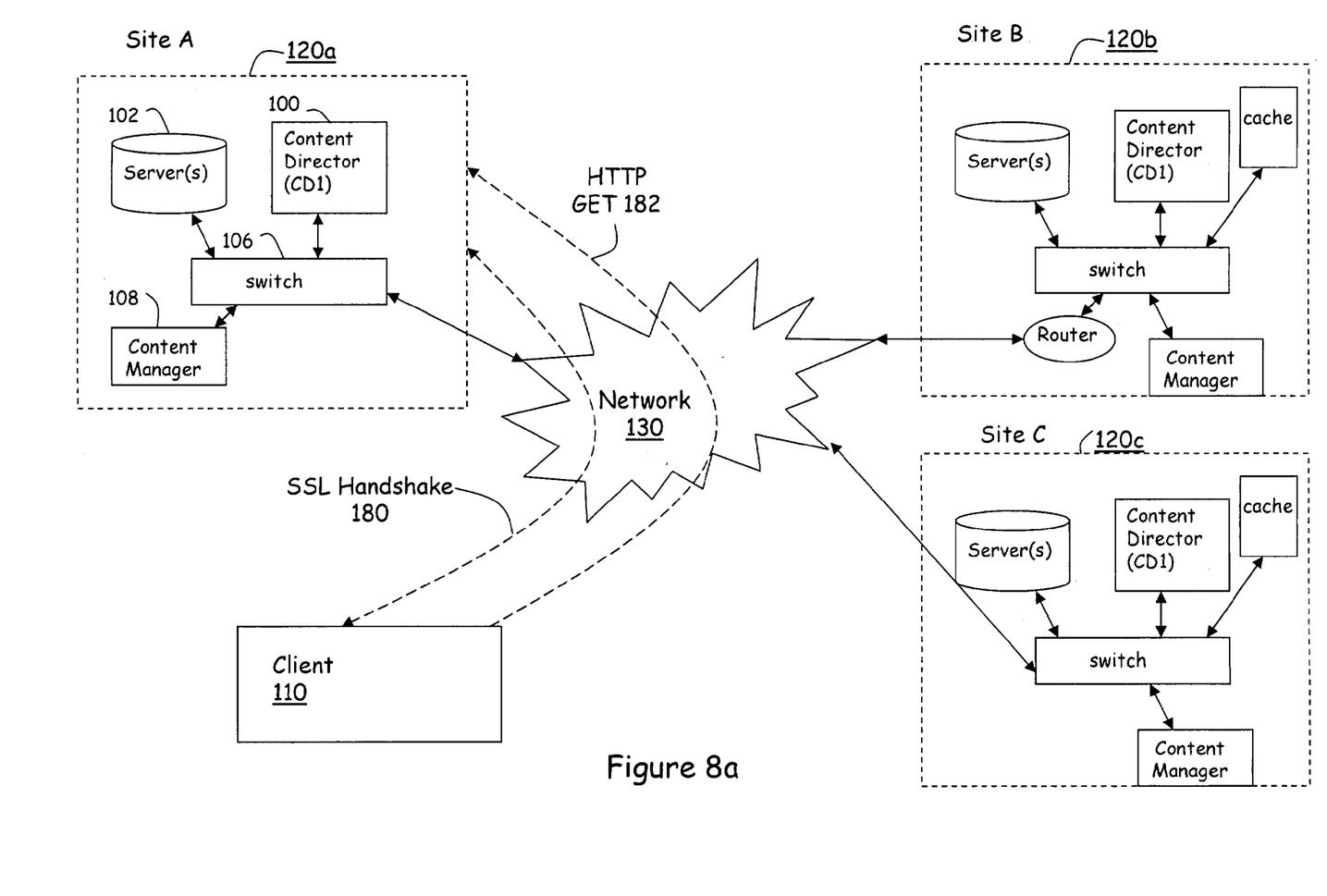
FIGS. 8a, 8b and 8c illustrate the flow of requests and responses through the system of FIG. 2 using the process of FIG. 7.
Figure 8B:
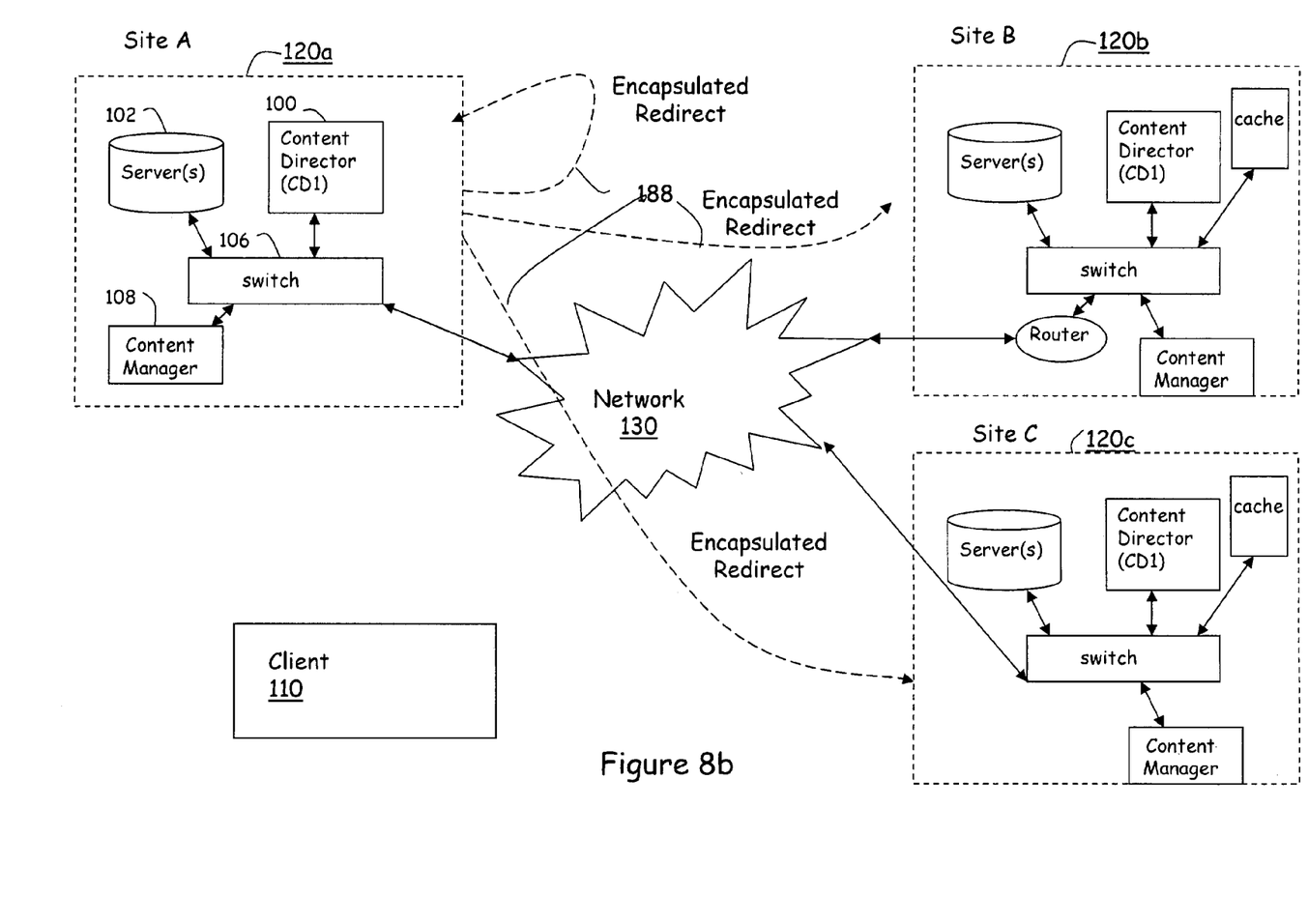
Figure 8C:
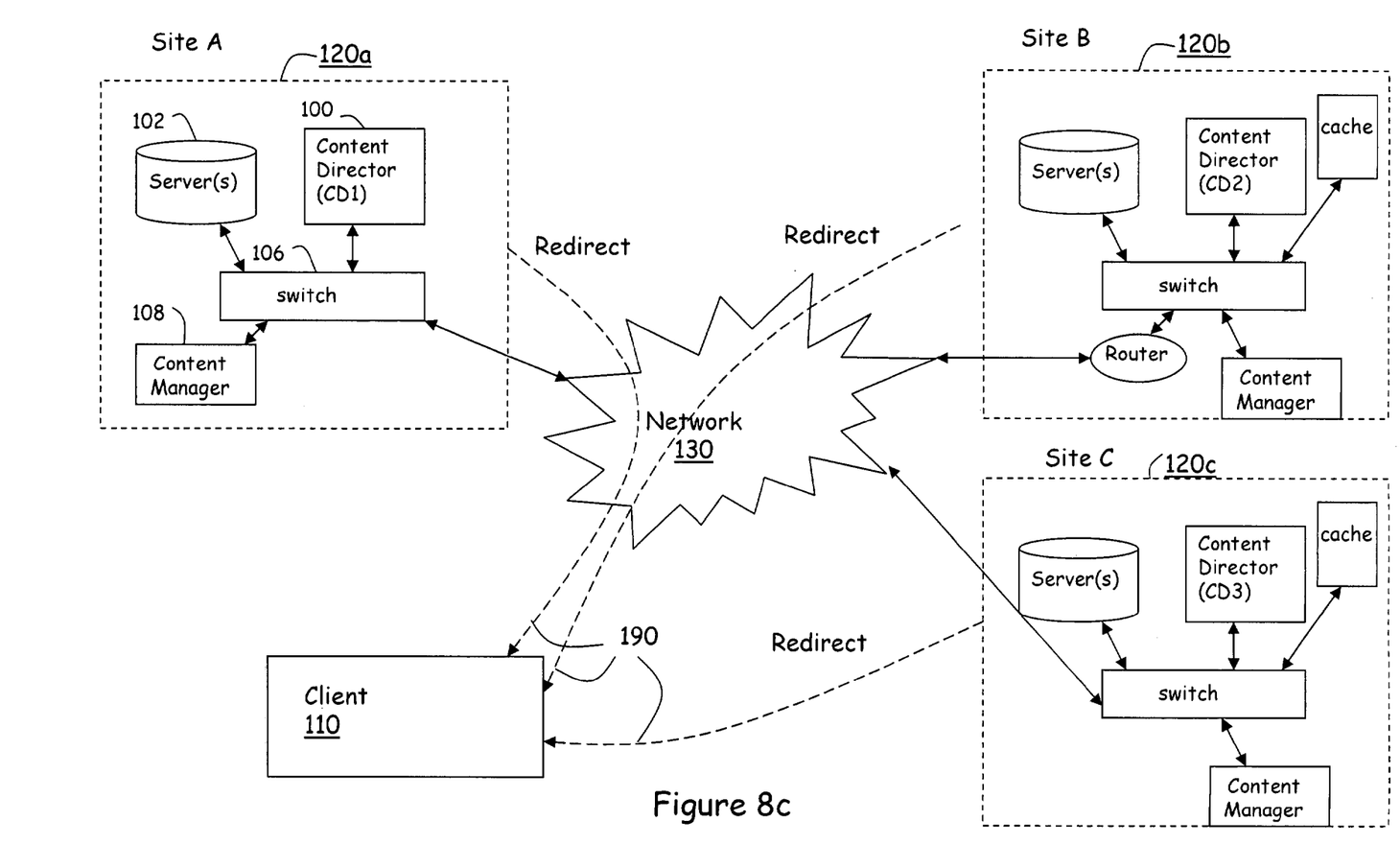

An example of how the system may work to provide disaster recovery in the event of a server farm failure at Site A is shown in FIGS. 5 and 6. At step 162, the client establishes TCP connection and completes SSL handshake after site selection (using, for example, the site selection method described below in FIGS. 7 and 8a-8c). At step 164, the CD at site A detects a server farm failure. In the event of a subsequent request by the client to a resource serviced by site A, site A, at step 167 site A decrypts the request and at step 168 examines the address of the request to identify the global domain of the resource. The CD at site A can then examine its database of local domains associated with the global domains to determine whether there is another local domain that can service the request for the resource. If at step 168 the CD at site A determines that there is no other site, then an error message is returned to the client. Otherwise, at step 170 site A forwards the request to the alternative local domain.

According to one aspect of the invention, the CDs in each global domain additionally use the IBP to exchange the SSL Session state information required for the alternative site to service the request. Thus, assuming that site B is the alternative site selected, at step 170 site A also forwards the SSL state information for decrypting and encrypting the request to site B. At step 172, site B decrypts the forwarded packet and forwards it to its associated server (or cache) for service. When the content is retrieved, the CD, at step 174, encrypts the content and forwards it directly back to the client. Subsequent traffic flows in a triangular pattern, with requests being made by the client to site A, B and back to the client until either the problem at site A is repaired, or an opportunity exists to tunnel directly to site B.

A second advantage of the present invention is that it allows the footrace method of determining client proximity to be performed even when the clients' requests are encrypted. The footrace may be performed as shown in FIGS. 7 and 8*a*-8*c*.

At step 182 the client establishes a TCP connection for a global address and a DNS resolves to a web site, for example web site A (hereinafter also referred to as the synchronizing web site). The client then establishes a secure connection to web site A. Subsequently, at step 184 the client issues a request for resource stored at web site A, but mirrored at alternative sites. At step 186, the synchronizing CD performs expression matching on the global domain name to identify the corresponding local domains in its database ('participating sites'). At step 188, for each participating site, the CD builds a redirect packet. When building the packet, the CD inserts the local domain name of the associated participating site into the redirect packet and encrypts the packet using the SSL Session ID and keys established with the client during the SSL handshake. The CD then encapsulates the redirect packet into a TCP/IP packet directed to the participating web site, and forwards it to that site. The header of the TCP/IP packet is encoded to identify the packet as an encrypted redirect packet to be used in a footrace, a client address, and a time at which the participating site is to forward the redirect packet to the client address. At step 190, each participating site decodes the TCP/IP header, identifies the packet as an encapsulated redirect, and extracts the redirect packet. At the time indicated by the synchronizing site, each participating site forwards the redirect packet to the client.

When the client receives its first redirect packet, at step 192 it closes the TCP session with the synchronizing CD, and initiates a new, secure connection to the local domain indicated in the first redirect packet received.

Accordingly, a system that enables load balancing of encrypted traffic has been described. The system may be used to provide disaster recovery, or alternatively to identify an optimal data center for servicing client requests. It should be noted that, although the above description has included discussion of the SSL protocol, the present invention may be used for any type of encrypted traffic, and the present invention should not be limited to the use of any specific security protocol.

Having described several embodiments of the invention, it should be understood that various modifications may be made within the spirit and scope of the invention, and the invention, therefore, should only be limited by the claims.

What is claimed is:

1. A method of redirecting encrypted requests for content includes the steps of:
   receiving, at a first content provider of a web site, data for establishing an encrypted tunnel with a client;
   receiving, at the first content provider of the web site, an encrypted request for content from the client over the encrypted tunnel;
   identifying an alternate content provider of the web site to service the request for content;
   encapsulating the encrypted request for content to provide an encapsulated encrypted request; and
   forwarding the encapsulated encrypted request for content to the alternate web site including forwarding the data for establishing an encrypted tunnel with the client to the alternate web site to enable the alternate web site to decrypt the encapsulated encrypted request.

2. The method according to claim 1, wherein the request for content is serviced by the alternate content provider of the web site to provide a response, and further including the step of the alternate content provider encrypting the response using the data for establishing the encrypted tunnel and forwarding the response directly to the client over the encrypted tunnel.

3. The method according to claim 1, wherein the step of encapsulating includes the step of appending a header to the encrypted request to indicate that the encapsulated encrypted request includes a pre-built packet for the client.

4. A method for disaster recover in a network wherein content is mirrored and traffic is encrypted includes the steps of:
   establishing, at a first data center, an encrypted communication path for delivery of content to a client;
   determining that content at the first data center is unavailable;
   responsive to receipt of an encrypted request from the client for the content after determining that the content at the first data center is unavailable, encapsulating the encrypted request to provide an encapsulated encrypted request and forwarding the encapsulated encrypted request to a second data center that mirrors the content, including forwarding key data associated with the client to enable the second data center to decrypt the encapsulated encrypted request.

5. The method according to claim 4, further comprising the step of the second data center responding directly to the client.

6. A data center storing a plurality of resources, the data center comprising:
   a table for storing, for at least one resource, an address of an alternate data center that stores a mirror copy of the resource;
   an interface for establishing an encrypted tunnel with a client device; and
   a storage mechanism for storing data enabling secure communication with the client device using the encrypted tunnel; and
   means for forwarding the data enabling secure communication with the client device using the encrypted tunnel to the alternate data center to enable the alternate data center to decrypt and service encrypted client requests when the resource at the data center is unavailable.

7. The data center according to claim 6 further comprising means, responsive to a determination that the at least one resource is unavailable at the data center, for forwarding requests received at the at least one resource to the alternate data center.

8. The data center according to claim 6, wherein the data enabling secure communication with the client device using the encrypted tunnel includes an encryption key, and wherein the data center includes means for decrypting a request for the at least one resource from the client using the encryption key.

9. The method according to claim 4, wherein the step of encapsulating includes the step of appending a header to the encrypted request to indicate that the encapsulated encrypted request includes a pre-built packet for the client.

10. The data center according to claim 7, further including means for encapsulating encrypted client requests with a header to provide encapsulated encrypted client requests, wherein the header indicates that the encapsulated encrypted requests include pre-built packets.

* * * * *